UNITED STATES PATENT OFFICE.

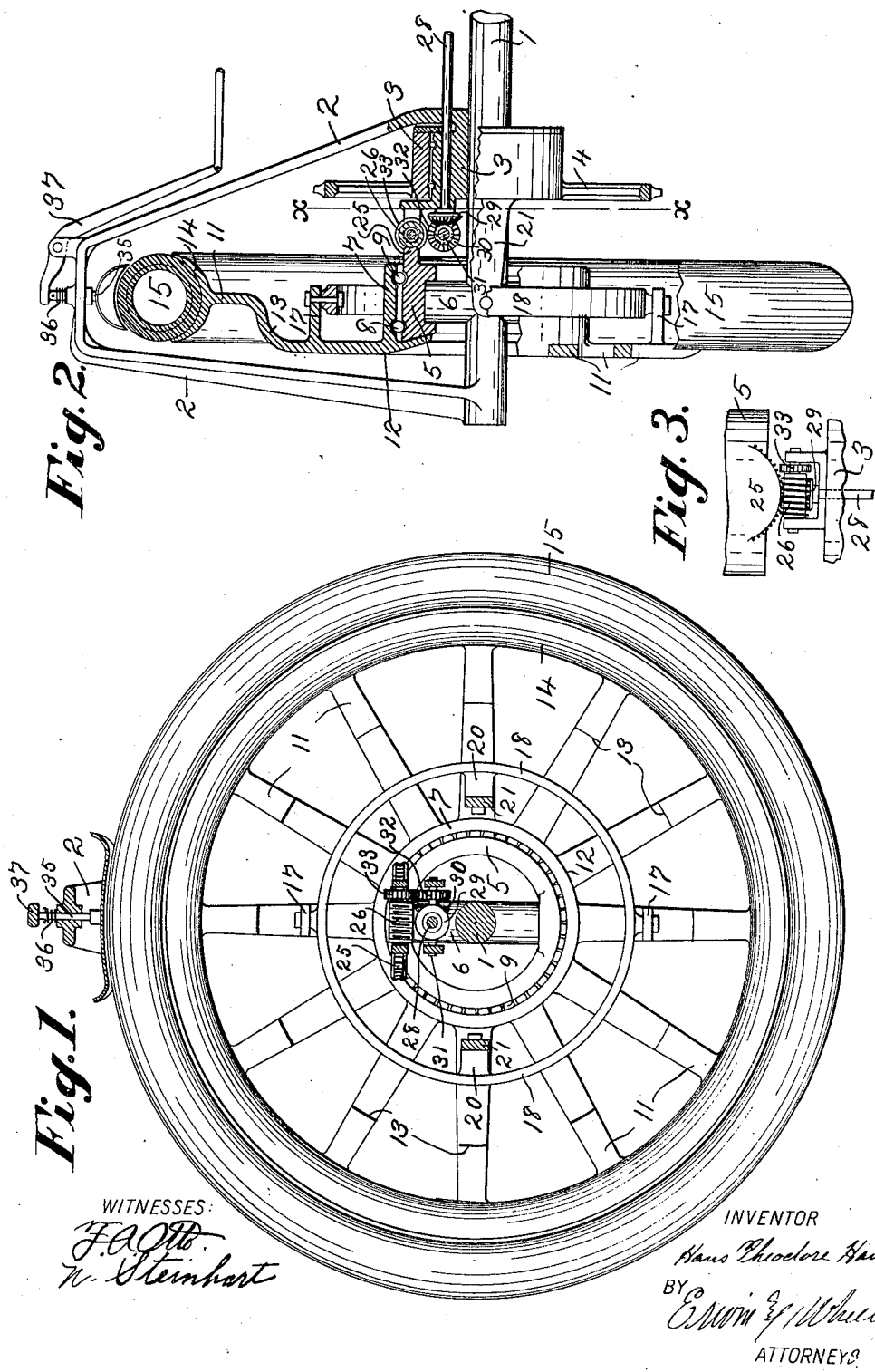

HANS THEODORE HANSEN, OF WAUWATOSA, WISCONSIN.

MOTOR-DRIVEN VEHICLE.

No. 812,338.  Specification of Letters Patent.  Patented Feb. 13, 1906.

Application filed April 15, 1905. Serial No. 255,702.

*To all whom it may concern:*

Be it known that I, HANS THEODORE HANSEN, a citizen of the United States, residing at Wauwatosa, county of Milwaukee, and State of Wisconsin, have invented new and useful Improvements in Motor-Driven Vehicles, of which the following is a specification.

My invention relates to improvements in motor-driven vehicles, and pertains especially to that class of such vehicles in which the power is applied to the steering-wheels through a universal joint in the plane of the wheel and of the pivot of its oscillation.

The object of my invention is to provide means whereby the joint of the driving connections may be located exterior to that of the supporting connections, thereby enabling me to provide a rigid stationary central support extending through the hub of the wheel and to provide driving connections of great strength and durability by obviating the necessity of the extreme economy of space, which is required where the driving connections are centrally located.

In the following description reference is had to the accompanying drawings, in which—

Figure 1 is a view of the inner side of a vehicle-wheel embodying my invention, showing the steering-rod and driving-arms of the sprocket-wheel in cross-section on line $x$ $x$ of Fig. 2. Fig. 2 is a view of the wheel with the lower half partially broken away and showing the upper half in axial section. Fig. 3 is a detail top view of the connections between the steering mechanism and the wheel.

Like parts are identified by the same reference characters throughout the several views.

1 is a stationary axle-shaft provided with a yoke 2, within which the wheel is mounted, and an annular projection 3, upon which the sprocket-wheel 4 is mounted. An oscillatory ring 5 is mounted on vertical pivot-studs 6, and the wheel-hub 7 is mounted upon this ring 5 with interposed antifriction balls or rollers at 8 and 9.

The spokes 11 of the wheel are connected with the outer end of the hub 7 at 12 and are dished or offset inwardly at 13, the rim 14 and tire 15 being in the central plane of the ring 5. Arms 17 project inwardly from two of the spokes of the wheel on opposite sides of the center, and a knuckle-ring 18 is pivoted to these arms. The knuckle-ring 18 is provided with inwardly-projecting pivot-studs 20 at right angles to the points of pivotal connection with the arms 17, and arms 21, projecting from the outer side of the sprocket-wheel 4, are pivotally connected with these studs, thus forming a universal joint of connection between the sprocket-wheel and the wheel of the vehicle in the plane of the latter and of the axis of oscillation on the pivot-studs 6.

To steer the wheel by oscillating the same on the studs 6, I have provided the oscillatory ring with a horizontal toothed segment 25 in mesh with a worm-shaft 26. Motion is transmitted to the worm-shaft 26 from any suitable source of power, manual or otherwise, through a rotary steering rod or shaft 28, bevel-pinions 29 and 30, shaft 31, and gear-wheels 32 and 33, the latter being fast on the worm-shaft 26. The steering-rod 28 extends through the annular projection 3 on the shaft 1.

A suitable brake-shoe may be conveniently supported from the yoke 2 by a rod 35 and spring 36, against the tension of which the brake-shoe is actuated by a lever 37. The brake-shoe is preferably swiveled to the rod 35, whereby it is permitted to adjust itself to the wheel.

Having thus described my invention, what I claim as new, and desire to secure by Letters Patent, is—

1. In a vehicle of the described class, the combination of a central fixed axle-shaft provided with vertically-extending pivot-studs; an oscillatory ring mounted on said pivot-studs; a wheel having its hub rotatably mounted on said ring; and driving mechanism having universal-joint connection with the wheel exterior to the hub and substantially in the plane of the wheel-rim.

2. In a vehicle of the described class, the combination of a centrally-pivoted wheel-support; a wheel-hub rotatable on said support; a wheel connected with the outer end of the hub and dished inwardly; and driving mechanism having universal-joint connection with the wheel between the hub and rim.

3. In a vehicle of the described class, the combination of a central pivoted wheel-support; a wheel-hub rotatable on said support; a wheel connected with the outer end of the hub and dished inwardly; and driving mechanism having universal-joint connection with the wheel between the hub and the rim; together with means for steering said wheel.

4. In a vehicle of the described class, the combination of a wheel having spokes connected with the outer end of the hub and offset inwardly at an intermediate point; a ring pivotally connected on opposite sides with two of the spokes, substantially in the plane of the wheel-rim; and a driving member having arms pivotally connected with said ring on opposite sides and at right angles to the line of wheel connection.

5. In a vehicle of the described class, the combination of a central fixed axle-shaft; an oscillatory ring supported from the shaft by vertical pivot-bearings; a wheel rotatably mounted on said ring; and driving mechanism having universal-joint connection with the wheel, between said ring and the rim of the wheel.

6. In a vehicle of the described class, the combination of a central fixed axle-shaft; an oscillatory ring supported from the shaft by vertical pivot-bearings; a wheel rotatably mounted on said ring; and driving mechanism having universal-joint connection with the wheel between said ring and the rim of the wheel; together with means mounted on the stationary shaft, for oscillating said ring.

7. In a vehicle of the described class, the combination of a central fixed axle-shaft; an oscillatory ring supported from the shaft by vertical pivot-bearings; a wheel rotatably mounted on said ring; and driving mechanism having universal-joint connection with the wheel between said ring and the rim of the wheel; together with a toothed segment mounted on said ring, and gear connections for transmitting motion to oscillate the ring through said segment.

8. In a vehicle of the described class, the combination of a central fixed axle-shaft; an oscillatory ring supported from the shaft by vertical pivot-bearings; a wheel rotatably mounted on said ring; and driving mechanism having universal-joint connection with the wheel between said ring and the rim of the wheel; together with means for oscillating said ring.

In testimony whereof I affix my signature in the presence of two witnesses.

HANS THEODORE HANSEN.

Witnesses:
LEVERETT C. WHEELER,
JAS. B. ERWIN.